Feb. 17, 1959

P. H. TAYLOR 2,873,963

LIQUID SPRING AND OLEO SUSPENSION FOR AIRCRAFT AND VEHICLES

Filed Nov. 9, 1954

Inventor
Paul H. Taylor

Feb. 17, 1959
P. H. TAYLOR
2,873,963
LIQUID SPRING AND OLEO SUSPENSION
FOR AIRCRAFT AND VEHICLES
Filed Nov. 9, 1954
2 Sheets—Sheet 2
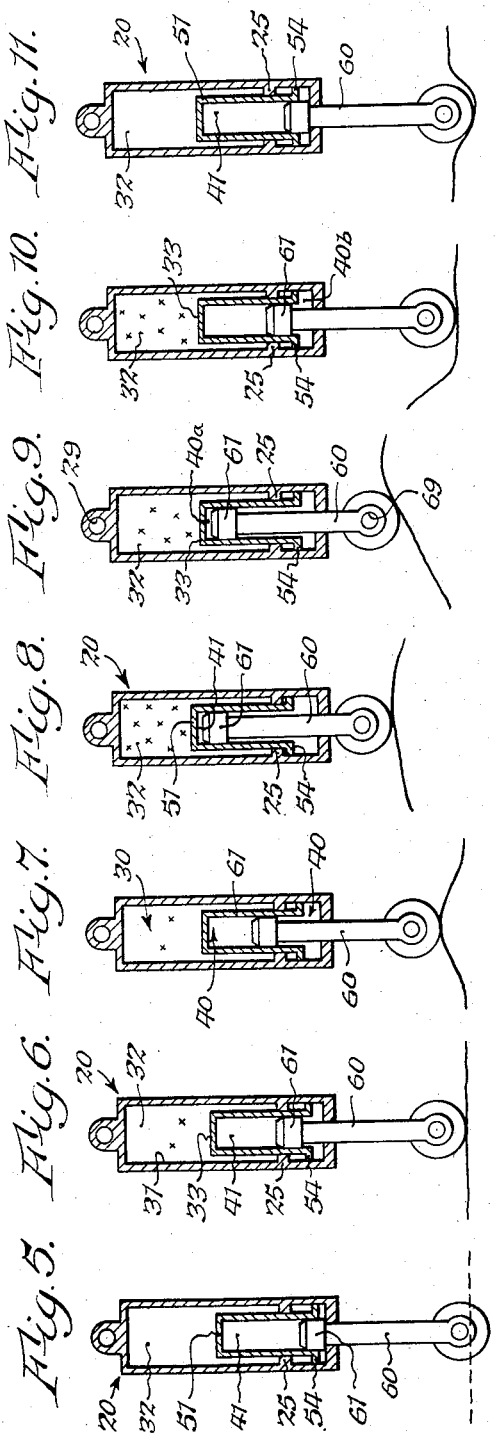
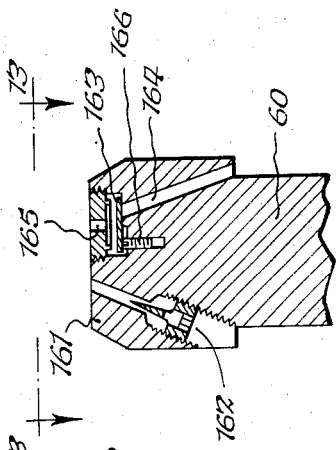
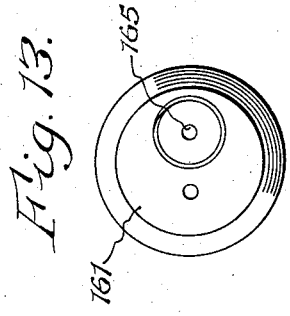
INVENTOR.
Paul H. Taylor

United States Patent Office 2,873,963
Patented Feb. 17, 1959

2,873,963

LIQUID SPRING AND OLEO SUSPENSION FOR AIRCRAFT AND VEHICLES

Paul H. Taylor, Grand Island, N. Y.

Application November 9, 1954, Serial No. 467,745

26 Claims. (Cl. 267—64)

This invention relates generally to combined spring shock absorber suspension units of the oleo type used for aircraft landing gear and land vehicles and more particularly to an oleo strut combining a liquid spring employing polymorphic compressible materials and a combined low presssure hydraulic magnification of the liquid spring stroke with dashpot dampening.

Oleos of the hydrapneumatic types utilizing oil compresssing a gas with orifice metering of the oil for shock dampening have been used on aircraft and automobiles. On aircraft these have been replaced in some instances by the more efficient liquid spring which includes a combined liquid spring and shock absorbers employing orifice metering of the entire liquid in the liquid spring. This invention is intended to supersede the former by providing the basic advantages of both with the efficiency of the liquid spring of the latter without the disadvantages of the present liquid spring installation. The hydrapneumatic oleo comprises a slender telescoping easily housed tubular member having low spring rates because of its air head with hydraulic lampening of excessive stroke or rebound. Its disadvantages include spring rate variations due to intermixing of oil and air, high preloads, fairly high weight and friction dampening. Service requirements are high because of gas leakage. Liquid springs have replaced these in some aircraft because of their greater efficiency in weight and space at high spring rates for a given energy absorption. However, liquid springs must use spring rates over 2000 pounds per inch deflection at which rate they attain a 300% advantage or efficiency compared with the existing mechanical springs or hydrapneumatic oleos and as the rates go up phenomenal efficiencies are realized of 10,000% or better.

Smaller aircraft and land vehicles generally only require a maximum of 750 pounds per wheel statically and about 5 G's or 3750 pounds on a five inch travel providing a spring rate of only 750 pounds per inch. Liquid springs can only be used in such an installation by greatly levering or magnifying the travel of the spring. Since the lever is in bending, structural parts must be heavy. In particular levering is objectionable because it adds to the weight, space, structure and costs and further makes the assembly difficult to mount, retract and house. In addition, the mechanically levered gear cannot be used interchangeably with existing hydrapneumatic oleos or vehicle suspension systems because of different structural attachment and housing requirements. The magnification of the internal dampening of the spring makes it critical and difficult and raises the internal pressure in an already highly stressed spring structure.

All present liquid springs are critical with respect to aircraft temperature requirements of —65° to +165° F. and vehicle temperature differentials which differentials contact or expand the liquids in the spring and vary the length of the spring which is also magnified causing great stroke variations. With combined liquid springs dampening arrangements difficulty is encountered using the more efficient highly compressible liquids because as a liquid is compressed it increases in viscosity varying the orifice characteristics and the dampening effect. The more compressible liquids are extremely light and this effect is much greater in highly compressible liquids and in some which are capable of polymorphism or the transition to solids in which a liquid spring located orifice is inoperative. Because of the present high pressures in liquid springs, piston areas and shafts are extremely small in diameter and anything over a short stroke of an inch at these rates makes the column length of the piston critical. Therefore existing liquid springs must be designed as a levered compromise between the short stroke high spring rate efficiency of liquid springs and the low spring rate long stroke requirements of aircraft and vehicles. Even with a levered short column, piston deflections in the unstable highly stressed piston shaft induces leakage in the accurate nonelastic seal of the high pressure chamber. Further difficulties with the high pressure seal are to be expected because it is exposed to environmental abrasive dust which reduces its service life. Because of compromising the design for long travel the seal life is low since it is proportional to the linear inches of seal travel, one seal providing 250,000 linear inches of seal travel at zero leakage. Short travel is desirable for long life. In addition, seal friction increases with internal p. s. i. and in a levered compromise pressures must be higher so seal friction and friction dampening increase. Levering in a vehicle places the spring near the centerline of the vehicle which increases the rolling moment of the car and the short stroke low volume dampening causes heat buildup and unpredictable spring performance. Existing levered liquid springs and suspension systems further have the disadvantage of failing to differentiate between falling in a hole, that is the wheel falling away from the chassis, or the chassis rebounding from a wheel. In the first instance lampening is not desirable, in the second instance it is.

These inherent difficulties in present liquid spring or other suspension designs are critical on aircraft despite the relatively short use of an airplane gear and serious on land vehicles.

The principal object of this invention is to reduce the weight, space, structure and costs of a liquid spring for aircraft and vehicles.

A second principal object is to provide a combined liquid spring shock absorber which can be completely interchangeable with existing aircraft hydrapneumatic oleos or present vehicle springs and shock absorbers.

Another principal object is to provide internal magnification of a liquid spring stroke.

Yet another principal object is to provide shock dampening completely independent of the liquid spring and the characteristics of the compressible medium.

A combined principal object is to provide a liquid shock material having a natural shock resistance.

A related principal object is to provide a shock medium capable of differentiating between a free extension of a wheel and a rebound.

Another important object is to provide double acting shock absorption from a single acting spring medium.

Yet another main object is to provide high spring rate terminal travel in either direction of the spring medium.

A further object is to provide temperature compensation in a liquid spring.

Another object is to isolate the high pressure seal areas from dust or abrasive atmospheres.

A further important object is to reduce seal travel in a liquid spring for a given energy absorption.

Another important object is to provide a relatively low spring rate over the range of normal travel of the shock strut.

Another object is to provide a level ride.

Another object is the elimination of external levering.

A further object is a more rigid spring column.

Another object is isolation of the high pressure spring chamber from the elements.

A related object is to reduce the leakage effect from the seal of a liquid spring.

A further object is to provide a two stage liquid spring.

Another object is to provide low pressure friction free short stroke movement without friction dampening, and combined natural and dashpot dampening of high velocity movement with high spring rate characteristics of terminal travel of the oleo unit.

Yet another object is to provide a long stroke spring member adapted to be applied directly to the wheel axle.

A related object is to reduce vehicle roll.

Another object is to provide a suspension unit which by changing liquids can be adapted to changing vehicle weights.

These and other objects and advantages will be apparent from the following description of the construction and operation of my novel spring.

Figures 5 through 11 indicate diagramatically the various conditions and the relative positions of the apparatus under these conditions.

Figure 5 indicates strut 20 unloaded.

Figure 6 illustrates strut 20 loaded statically by the supported aircraft or vehicle.

Figure 7 shows strut 20 deflecting under minor road undulations.

Figure 8 illustrates strut 20 with a slowly applied maximum load.

Figure 9 shows strut 20 reacting from a high velocity shock load.

Figure 10 shows the effect of a rapid rebound on strut 20.

Figure 11 illustrates the effect of strut 20 dropping in a chuck hole.

Figure 12 illustrates a sectional view of a modified piston head incorporating a dampening valve.

Figure 13 is a sectional view taken as noted of Figure 12.

Figure 1:
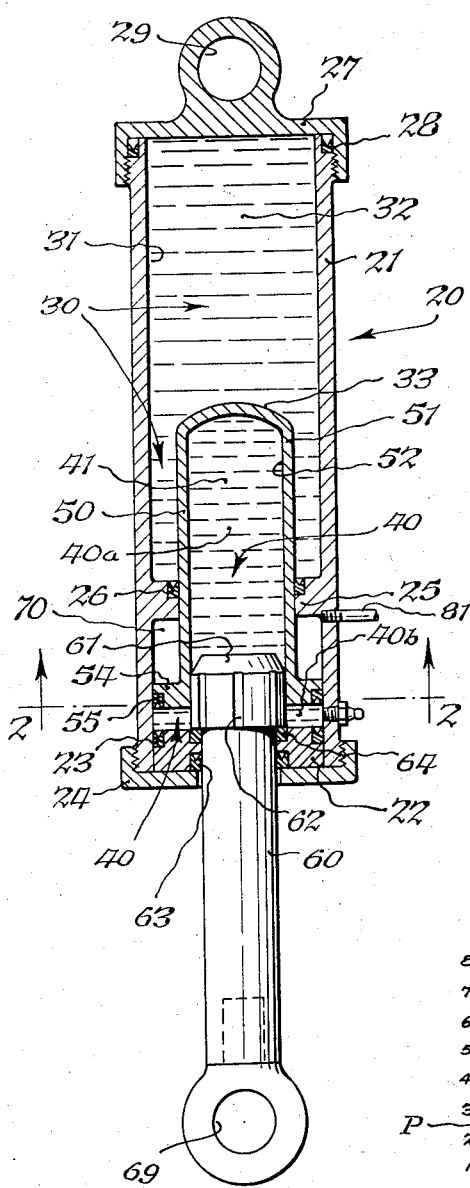
Figure 1 is a sectional side elevation of my oleo illustrating the two stage chambers providing hydraulic magnification of the liquid spring action.
Figure 2:
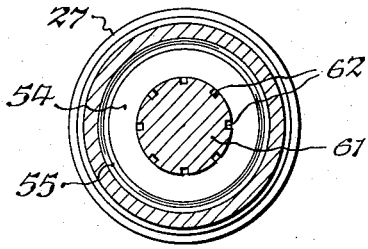
Figure 2 is a sectional view illustrating the piston head dampening taken as noted along line 2—2 of Figure 1.

Figure 1 illustrates my novel two stage liquid spring assembly 20 which is adapted to be attached to the structure at 29 and the wheel at 69 respectively of an aircraft or vehicle to resiliently support it thereby replacing existing hydrapneumatic oleos or long soft vehicle springs. It can thus be applied adjacent a vehicle wheel reducing roll effect. High pressure stage is shown generally at 30 and the low pressure stage at 40 (2 places). High pressure stage 30 consists of a high pressure chamber 31 in cylinder 21 having a compressible medium 32 therein such as for instance, a dimethyl siloxane having a pressure transition of 5½% at a constant pressure level of 20,000 p. s. i. which is therefore adapted to polymorphism and a high pressure piston 33. It will be noted that high pressure piston 33 is part of a hat shaped member 50 which includes the exterior 51 and the bore 52 for receiving and guiding the metering dampening head 61. It will be further noted that flange 54 and seal 55 of member 50 with bore 52 provides the low pressure chambers 40 having a compressible medium 41 therein characterized by good compressibility of around 3% at maximum design pressure in the low pressure stage of 4,000 p. s. i. Chamber 40 consists of chamber $40a$ above and $40b$ below piston head 61. Chambers 40 are primarily pressurized by piston shank 60 which is sealed by the seal 63. Cylinder end caps 27 and 24 containing guide plug 22 which with seals 28 and 23 respectively contain the compressible liquid mediums in the chambers 30 and 40 respectively. Web 25 with seal 26 forming the other end of the high pressure chamber 30 and the guide for the high pressure piston surface 51 of member 50 which also forms the end wall of low pressure chambers 40.

Basically the structure consists of a high pressure liquid spring containing compressible material 32 in the chamber 30 and piston 33 for pressurizing it. A small piston 60 operating through compressible liquid 41 against large piston 54 coupled with piston 33 provides hydraulic magnification of the stroke. Orifice dampening grooves 62 in piston head 61 and compressible material 32 adapted to polymorphic dampening are arranged to provide shock absorption. It will be noted that short stroke high pressure piston 33 is guided at 25 and 26 and by low pressure piston 54 providing long seal life because of the short stroke and the elimination of side loads on the tough, hard low elastic seal.

Chamber 70 is thus formed by web 25 and piston 54 which by means of pipe 81 can be pressurized from a pressure source, such as the engine hydraulic air systems to apply additional pressure to piston 54 to compensate for different weights thus providing a level ride. Further because of hydraulic magnification piston 60 is a sturdy structural member. This unit can be used interchangeably with existing struts or springs.

For the operation of the oleo under all ride conditions we will now refer to Figures 5 through 11, Figure 5 illustrating the position of the elements also shown in Figure 1 of an unloaded strut such as when the vehicle is jacked or the strut is loose. Figure 6 illustrates the strut under normal static load such as the weight of the aircraft or vehicle and illustrating by the X's that low polymorphism preferably is already beginning representative of the point P on the graph of Figure 4. The strut 20 can be positioned at a constant static location if desired representative of the point P by means of the external pressure applied to chamber 70 as described hereinbefore.

Figure 7 illustrates the effect of minor road shocks with high pressure material 32 unaffected but low pressure material 41 is absorbing the movement, shock dampening, if any, by orifice head 61.

Figure 3:
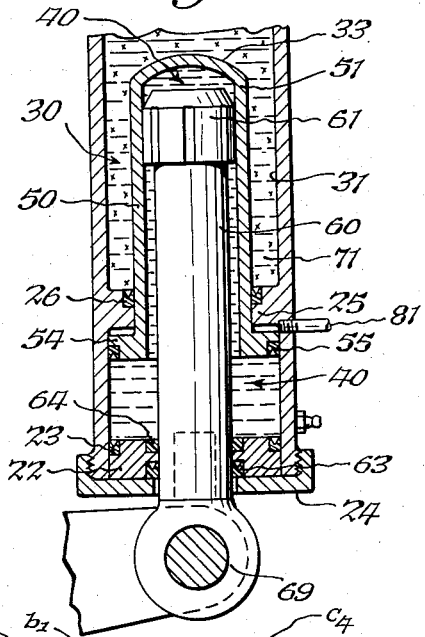
Figure 3 is a view similar to Figure 1 but illustrating the terminal compressed travel of the assembly with a polymorphic transition having taken place in the high pressure chamber.

Figure 8 is the condition also shown in Figure 3 and by graph as curve $a_2$ (Fig. 4) in which polymorphic transition is complete and further travel beyond the polymorphic range of material 32 will produce the terminal travel high spring rates of graph $\alpha_3$ (Fig. 4) combining the low compressibility of past the polymorphic range to provide high shock resistance.

Figure 4:
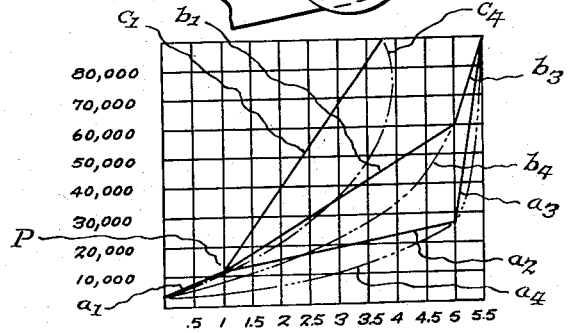
Figure 4 is a graph of the characteristics per travel velocity condition.

Figure 9 illustrates a high velocity shock load with little polymorphic dampening due to action of restriction 62 of piston head 61 which thereby applies high pressures to chamber $40a$ to transmit pressure direct to high pressure piston 33 and material 32 which has the effect of reducing the leverage momentarily to, say, 2 to 1 increasing the shock resistance tremendously, shown by curve $c_1$ (Fig. 4). An intermediate velocity shock load would provide the curve $b_1$ (Fig. 4).

Figure 10 illustrates a rapid rebound from the position of Fig. 9 in which pressure on the $40b$ side of piston head 61 is suddenly increased applying pressure suddenly to material 32 by large diameter piston 54 increasing the percentage of polymorphic transition in material 32 and thereby absorbing the rebound (curve $c_4$, Fig. 4). Since the time of reversal of polymorphism is directly proportional to the duration of time it is applied it will be apparent that recovery will be as rapid as the applied load. This provides double action shock absorption (such as $b_4$, $a_4$, Fig. 4) from a single action spring.

Figure 11 illustrates a condition such as a wheel dropping in a chuck hole in which it must tend to drop freely. Since this is in the range below polymorphism the wheel can move outward with great freedom. It will thus be apparent that my strut can sense the difference between a rapid rebound from compression and a drop into a chuck hole.

Some movement upward of large diameter piston 54 will be apparent in the latter instance providing a little shock resistance to outward travel for the reasons given in the discussion of Figure 10 and overtravel or terminal stopping will occur against nylon block 64.

In Figure 12 I show a modified piston head 161 incorporating an adjustable metering valve 162 for controlling constant flow bypass liquid at all times. Flapper valve 163 partially closes off port 164 as established by adjustable screw 166 when piston 60 is in its compression stroke but closes off port 165 completely in the tension stroke so only constant flow valve 162 is in operation. Obviously this valve can be modified or changed without affecting the scope of this invention.

Preferably some non-polymorphic material of the silicone or fluorcarbon family is used in low pressure stage chamber 40 having good compressibility of 3% by volume at 4,000 p. s. i. with little change of viscosity due to this pressure. Various viscosities are available and could be used in chamber 40 depending on the viscous flow dampening required. Liquids may be changed to provide for different vehicle weights on the same spring or when temperature extremes occur.

The material 32 in chamber 31 preferably is of the silicone family also but adapted to polymorphism or constant change of volume of, say, 7% at a slow constant applied pressure of for instance 10,000 p. s. i. Material 32 can be a blend or pure polymorphic as circumstances require. A material of this type may compress by volume say 2% as a compressible liquid curve $a_1$, Fig. 4, and as much as 16% of constant pressure $a_2$ but be adapted to resist shock loads at high velocity with a high rate of pressure increase to 20,000 p. s. i. ($a_4$, Fig. 4). This characteristic occurs because at certain pressures the material undergoes polymorphic transition or change of state, of from in this instance, liquid to solid if compressed slowly at constant pressure but if compressed suddenly it resists the polymorphic change from liquid to solid. I have found this transition can be made and reversed constantly without affecting the compressible material properties. This provides in the high pressure chamber natural shock absorption, plus a low spring rate for gradual undulations of the sprung wheel such as is illustrated by curve $a_2$ (Fig. 4) and Fig. 7. In addition, high velocity movements provide high spring rates due to resisting polymorphic transition curve $c_1$ (Fig. 4) and Fig. 9. Terminal travel very high spring rates are provided because terminal travel is arranged to be beyond the constant pressure polymorphic range in which the pressure again increases rapidly with further volume decrements, such as at $a_3$, $b_3$.

The variable spring rates and energy absorbed for given travels and velocities of piston 60 are explained in Fig. 4 showing characteristics of a 10,000 pounds per wheel on average pursuit aircraft or truck vehicle. However, conditions of this spring can be altered radically for different weights and conditions by changing liquids and polymorphic materials and ratios.

It will be apparent that many variations can be made of hydraulic magnification of a liquid spring and the use of polymorphism in a spring as well as the combination with viscous dampening in a two stage compressible material device within the scope of the present invention and the claims appended hereto.

In particular, this construction can be modified slightly for machine tool use in which longer travel springs are required or in other applications where spring life should be longer than present liquid springs. This is accomplished by the short liquid spring of my present invention with its sturdy large area piston which is guided in two positions thus preventing side deflection on the stiff low elastic seal, as well as its buried location. Obviously straight compressible materials can be used in such an application.

All such modifications can be made within the scope of the present invention and the claims appended hereto.

I claim:

1. A two stage compressible non-gaseous material spring comprising a first stage having a low pressure chamber, a compressible non-gaseous material contained therein, a first piston reciprocable in said low pressure chamber for the application of pressure to the compressible material therein, a second stage having a high pressure chamber, a second compressible non-gaseous material contained therein said material being adapted to a polymorphic transition and a second intensifying piston member reciprocable in said low and high pressure chambers for multiplying the pressure in the first stage from said first piston to the second stage.

2. A liquid spring for a vehicle comprising a multiple chamber pressure vessel having a high pressure chamber, a separate low pressure chamber, a piston reciprocable therein, a second multiple area piston reciprocable in said low and high pressure chambers which defines at least one additional pressure chamber completely separated from said high and low pressure chambers, and means for applying external fluid pressure to said additional pressure chamber and said multiple area piston whereby the various weights of said vehicle can be compensated for by external fluid pressure.

3. A liquid spring for a vehicle comprising a multiple chamber pressure vessel having a high pressure chamber, a separate low pressure chamber, a piston reciprocable therein, a second multiple area piston reciprocable in said low and high pressure chambers which defines at least one additional pressure chamber completely separated from said high and low pressure chambers, said first named piston being subject to vehicle wheel movement whereby said low pressure chamber and said large area of said multiple area piston is subject to low pressure which is translated to said high pressure chamber, and means for applying fluid pressure externally to the additional pressure chamber and said multiple area piston to compensate for variable vehicle weights.

4. A spring comprising a casing having a chamber therein, a compressible material other than a gas completely filling said chamber, said material being adapted for reversible polymorphic transition at a substantially constant pressure, a piston reciprocably disposed in said chamber for compressing said material, and means operatively associated with said piston for applying variable loads on the piston to compress said material through a range of pressures including said constant pressure.

5. A spring comprising a casing having a pressure chamber therein, a compressible material adapted for reversible polymorphic transition at a substantially constant pressure disposed in said chamber, and piston means in said casing having a portion subjected to external loads for compressing said material through a range of pressures including said constant pressure and in proportion to the magnitude of the external loads applied, whereby some external loads applied to said piston means compress said material to at least said constant pressure to cause polymorphic transition in the material to a degree varying as the length of time of application of the loads and whereby rebound of said piston means is dampened an amount varying as the degree of polymorphic transition in the material.

6. A liquid spring comprising two relatively reciprocable members, and a compressible liquid medium operatively contained between said members and adapted for being compressed in response to compressive loads applied to said members, said compressible medium consisting of a normally liquid material which undergoes reversible polymorphic transition at a substantially constant pressure within the range of compression of the material resulting from compressive loads applied to the members.

7. A spring comprising mechanism collapsible in response to application of compressive loads, and a compressible medium operatively associated with said mechanism to resist collapsing of the mechanism by compression of the medium, said medium being a material other than a gas and which undergoes reversible polymorphic transition within the range of normal compression of the material.

8. A spring comprising mechanism collapsible in response to application of compressive loads, and a compressible medium operatively associated with said mechanism to resist collapsing of the mechanism by compression of the medium, said medium consisting of a material other than a gas which undergoes reversible change in the form of the material itself within the range of normal compression of the material to dampen rebound of said mechanism through said reversible change.

9. A spring comprising a casing having a pair of chambers therein, compressible non-gaseous materials filling said chambers, and a piston reciprocably disposed in each of said chambers for compressing the non-gaseous material therein in response to compressive loads applied to the pistons, said non-gaseous material in at least one of said chambers consisting of a material other than a gas which undergoes reversible change in the form of the material itself within the range of normal compression of the material to dampen the rebound of said pistons through said reversible change.

10. A spring according to claim 9 wherein said non-gaseous material in at least one of said chambers undergoes reversible polymorphic transition at a substantially constant pressure within the range of compression of the material resulting from the compressive loads applied to the piston in said one chamber.

11. A spring comprising a casing having two pressure chambers, a first compressible material adapted for reversible polymorphic transition at a substantially constant pressure disposed in one of said chambers, a piston in said casing for compressing said first material through a range of pressures including said constant pressure in response to compressive loads applied to said piston, a second compressible material disposed in the other of said chambers, and a second piston in said casing operatively associated with said first piston for compressing said second material in response to compressive loads applied to the second piston and for actuating said first piston to compress said first material, whereby some compressive loads applied to said second piston act through said second material and said first piston to apply at least said constant pressure in said first material to cause polymorphic transition to a degree varying as the time interval of application of the pressure and whereby rebound of said second piston after release of the compressive loads is dampened as a consequence of the time lag of reverse polymorphic transition in said first material.

12. A spring comprising a casing having a pair of separable chambers therein, compressible non-gaseous materials filling said chambers, a first piston reciprocably disposed in said casing and separating said chambers, said first piston having a reduced diameter portion in one of said chambers for compressing the non-gaseous material therein in response to compressive loads applied to the first piston and an enlarged diameter portion in the other of said chambers, and a second piston reciprocably disposed in the other of said chambers for compressing the non-gaseous material therein in response to compressive loads applied to said second piston whereby compression of the non-gaseous material in said other chamber imposes pressure on both portions of said first piston and intensifies the pressure in said one chamber.

13. A spring according to claim 12 wherein the non-gaseous material in said one chamber is adapted for reversible polymorphic transition at a substantially constant pressure within the range of compression of the material resulting from the compressive loads applied to said first piston.

14. A spring comprising a casing having a pair of chambers therein, compressible liquids filling said chambers, a first piston having a portion reciprocably disposed in one of said chambers and completely separating the liquids in the respective chambers, said first piston having a cylindrical bore open to the other of said chambers, a second piston reciprocably disposed in said bore of said first piston for compressing the liquid in the other of said chambers in response to compressive loads applied to said second piston and for thereby exerting compressive force against said first piston to cause compression of the compressible liquid in said one chamber.

15. In a liquid spring including a casing having two pressure chambers therein filled with two different compressible liquids, a first piston in said casing completely separating said chambers and adapted for compressing the liquid in the first of said chambers, said first piston having a small area portion communicating with said first chamber and a large area portion communicating with the second of said chambers, a second piston in said casing adapted for compressing the liquid in said second chamber and for exerting pressure against said small area portion and said large area portion of said first piston for causing intensified compression of the liquid in said first chamber.

16. A liquid spring according to claim 15 wherein the liquid in said one chamber consists of a material which undergoes reversible polymorphic transition within the normal range of compression of the material.

17. A spring comprising a casing having compressible material means therein, a first piston reciprocably disposed in said casing and adapted for compressing a portion of said compressible material means in response to compressive force applied to said first piston, said first piston completely separating said portion of the compressible material from the remainder of the compressible material and having a cylindrical bore and an enlarged area force intensification portion, a second piston reciprocably disposed in the bore of said first piston and adapted for compressing the remainder of said compressible material means and for exerting said pressure against said force intensification portion of said first piston for exerting a larger force against said first piston than the force exerted against said second piston.

18. A liquid spring comprising a casing having a pair of axially aligned cylindrical chambers therein, means defining a reduced diameter circular aperture between said chambers, a first piston reciprocably disposed in said casing and having one portion blocking said aperture and extending into the first of said chambers, said first piston including an enlarged diameter portion disposed in the other of said chambers, and piston means reciprocably disposed in the other of said chambers for exerting direct pressure force against said first portion of said first piston upon application of sudden compressive loads against said piston means and for exerting pressure against both portions of said first piston upon application of more gradual compressive loads against said piston means.

19. A liquid spring comprising a casing having a pair of chambers therein, a first piston reciprocable in said casing and having a reduced diameter portion blocking communication between said chambers and inserted in one of said chambers, said first piston having an enlarged diameter portion disposed in the other of said chambers and dividing said chamber into two portions, compressible liquids filling said one chamber and one portion of said other chamber, piston means in said one portion of said other chamber adapted for compressing the liquid therein for exerting pressure against both portions of said first piston to provide a compressive force thereon to cause intensified compression of the liquid in said one chamber, and external means for exerting compressed fluid pressure in the other portion of said other chamber to oppose the compressive force exerted by compression of the liquid in said one portion of said other chamber and to vary the operational characteristics of said spring.

20. A liquid spring according to claim 19 wherein the compressible liquid in said one chamber is adapted for reversible polymorphic transition at a substantially constant pressure within the range of compression of the liquid resulting from compressive forces applied to said first piston.

21. A liquid spring comprising a high pressure chamber, a low pressure chamber, compressible liquids in each of said chambers, a piston slidable in and adapted to pressurize the liquid in said low pressure chamber, and a second intensifying piston reciprocable in both chambers and completely separating the liquid in the respective chambers for magnifying the pressure from said low pressure chamber to said high pressure chamber.

22. A liquid spring comprising a high pressure chamber, a low pressure chamber, compressible liquids in each of said chambers, a piston slidable in and adapted to pressurize said low pressure chamber, and a second piston reciprocable in said high pressure chamber and completely separating the liquid in the respective chambers, said second piston having a plurality of pressure multiplying areas in said low pressure chamber for translating a long actuating stroke of said first piston in said low pressure chamber to a short stroke in said high pressure chamber.

23. A liquid spring comprising a casing having a pair of pressure chambers with compressible liquid therein, a pair of interrelated pistons one of which is reciprocable in one of said chambers and has pressure intensifying areas disposed in the other of said chambers, the other of said pistons being reciprocable in said other chamber to translate hydraulic leverage from said other piston through the compressed liquid in said other chamber and through said intensifying areas to said one piston.

24. A liquid spring according to claim 23 wherein said other piston has restricted metering passages therethrough whereby when said other piston is subjected to high acceleration forces the pair of inter-related pistons move essentially in unison to reduce the hydraulic leverage translated from said other piston to said one piston.

25. A liquid spring according to claim 23 wherein said one piston has a pair of pressure intensifying areas separated by said other piston, whereby pressure may be applied to one or both of said pressure intensifying areas depending upon the acceleration of forces applied to said other piston.

26. A liquid spring according to claim 23 wherein two pressure intensifying areas are provided on said one piston with said other piston separating said areas, and means operatively associated with said other piston for metering liquid past said other piston, whereby application of high acceleration forces to said other piston in one direction applies liquid pressure in said other chamber essentially to only one of said intensifying areas, and whereby application of high acceleration forces to said other piston in the other direction applies liquid pressure in said other chamber essentially to only the other of said intensifying areas.

References Cited in the file of this patent

UNITED STATES PATENTS

| | | |
|---|---|---|
| 1,780,659 | Wallace | Nov. 4, 1930 |
| 2,333,096 | Dowty | Nov. 2, 1943 |
| 2,388,885 | Underwood | Nov. 13, 1945 |
| 2,537,634 | Brown | Jan. 9, 1951 |
| 2,554,807 | Bingham | May 29, 1951 |
| 2,660,984 | Zumwalt | Dec. 1, 1953 |

FOREIGN PATENTS

| | | |
|---|---|---|
| 664,972 | Great Britain | Jan. 16, 1952 |

UNITED STATES PATENT OFFICE
CERTIFICATE OF CORRECTION

Patent No. 2,873,963                                                    February 17, 1959

Paul H. Taylor

It is hereby certified that error appears in the printed specification of the above numbered patent requiring correction and that the said Letters Patent should read as corrected below.

Column 1, line 36, and column 2, line 41, for "lampening", each occurrence, read -- dampening --; column 1, line 70, for "contact" read -- contracts --.

Signed and sealed this 16th day of June 1959.

(SEAL)
Attest:

KARL H. AXLINE
Attesting Officer

ROBERT C. WATSON
Commissioner of Patents